United States Patent
Levesque

(10) Patent No.: US 9,990,040 B2
(45) Date of Patent: Jun. 5, 2018

(54) HAPTIC CAPTCHA

(71) Applicant: Immersion Corporation, San Jose, CA (US)

(72) Inventor: Vincent Levesque, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 277 days.

(21) Appl. No.: 14/865,373

(22) Filed: Sep. 25, 2015

(65) Prior Publication Data

US 2017/0090569 A1 Mar. 30, 2017

(51) Int. Cl.
| | |
|---|---|
| *G08B 6/00* | (2006.01) |
| *G09B 21/00* | (2006.01) |
| *H04B 3/36* | (2006.01) |
| *G06F 3/01* | (2006.01) |
| *G06F 21/36* | (2013.01) |
| *G06F 21/31* | (2013.01) |

(52) U.S. Cl.
CPC .......... G06F 3/016 (2013.01); G06F 21/316 (2013.01); G06F 21/36 (2013.01); *G06F 2221/2103* (2013.01); *G06F 2221/2133* (2013.01)

(58) Field of Classification Search
CPC ........ G06F 3/016; G06F 21/316; G06F 21/36; G06F 2221/2133; G06F 21/31; H04L 63/083
USPC ...................................................... 340/407.2
See application file for complete search history.

(56) References Cited

U.S. PATENT DOCUMENTS

| | | | | |
|---|---|---|---|---|
| 8,776,173 | B2 * | 7/2014 | Paxton ................ | G06F 21/36 |
| | | | | 382/120 |
| 9,501,630 | B2 * | 11/2016 | Paxton ................ | G06F 21/36 |
| 9,710,643 | B2 * | 7/2017 | Jakobsson ........... | G06F 21/36 |
| 9,722,985 | B2 * | 8/2017 | Tartz .................. | G06F 21/36 |
| 9,723,005 | B1 * | 8/2017 | McInerny ............ | G06F 21/60 |
| 2012/0246737 | A1 | 9/2012 | Paxton et al. | |

(Continued)

FOREIGN PATENT DOCUMENTS

| | | |
|---|---|---|
| EP | 2 605 171 A2 | 6/2013 |
| WO | 2007096648 A1 | 8/2007 |

OTHER PUBLICATIONS

Stanley A. Klein, "Measuring, estimating, and understanding the psychometric function: A commentary", Perception & Psychophysics 2001, 63 (8), 1421-1455, http://cornea.berkeley.edu/pubs/148.pdf.

*Primary Examiner* — John A Tweel, Jr.
(74) *Attorney, Agent, or Firm* — Medler Ferro Woodhouse & Mills PLLC

(57) ABSTRACT

A system performs haptic challenge-response functionality. The system generates one or more haptic effects, provides the one or more haptic effects as a haptic challenge question to a user via a haptic output device, and receives an answer from the user corresponding to the haptic challenge question. The system then determines, based on a model of human perception, whether the answer corresponds to a correct answer to the haptic challenge question. One embodiment predicts the correct answer to the haptic challenge question, compares the correct answer with the answer received from the user, and determines that the user is a human when the answer matches the correct answer. One embodiment repeats the generating, the providing, the receiving, the predicting, and the comparing when the answer does not match the correct answer.

20 Claims, 5 Drawing Sheets

(56) References Cited

U.S. PATENT DOCUMENTS

2014/0253303 A1  9/2014  Levesque
2014/0365883 A1  12/2014 Ramsay et al.
2015/0254448 A1  9/2015  Tabak

* cited by examiner

HAPTIC CAPTCHA

FIELD

One embodiment is directed generally to an online system, and in particular, to an online system that determines characteristics of a user.

BACKGROUND INFORMATION

"Haptics" relates to a tactile and force feedback technology that takes advantage of the sense of touch of a user by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

SUMMARY

One embodiment is a system that performs haptic challenge-response functionality. The system generates one or more haptic effects, provides the one or more haptic effects as a haptic challenge question to a user via a haptic output device, and receives an answer from the user corresponding to the haptic challenge question. The system then determines, based on a model of human perception, whether the answer corresponds to a correct answer to the haptic challenge question. One embodiment predicts the correct answer to the haptic challenge question, compares the correct answer with the answer received from the user, and determines that the user is a human when the answer matches the correct answer. In one embodiment, the predicting is performed based on one or more of the model of human perception, an actuator response, or an actuator location with respect to the user. One embodiment repeats the generating, the providing, the receiving, the predicting, and the comparing when the answer does not match the correct answer.

DETAILED DESCRIPTION

One embodiment provides a haptic Completely Automated Public Turing test to tell Computers and Humans Apart ("CAPTCHA") to determine whether a user of a website or online service is human or automated. The haptic CAPTCHAs may be provided by selecting haptic tasks for which an expected response of a human user is difficult to guess without knowledge of the corresponding tactile perception. The response of a human user may be predicted based on functionality that models human perception, statistical user information (e.g., age, gender, occupation, etc.), actuator properties, and/or whether actuators are within range of a user. The requested user response may be received via a user interface ("UI"), a haptic input device, or any other device capable of receiving visual, audio, haptic, or any other input from the user. One embodiment further provides a secondary haptic CAPTCHA to gather information about tactile perception. A further embodiment provides a haptic CAPTCHA to authenticate a user. Accordingly, various embodiments provide a haptic challenge-response mechanism to obtain information about users.

Figure 1:
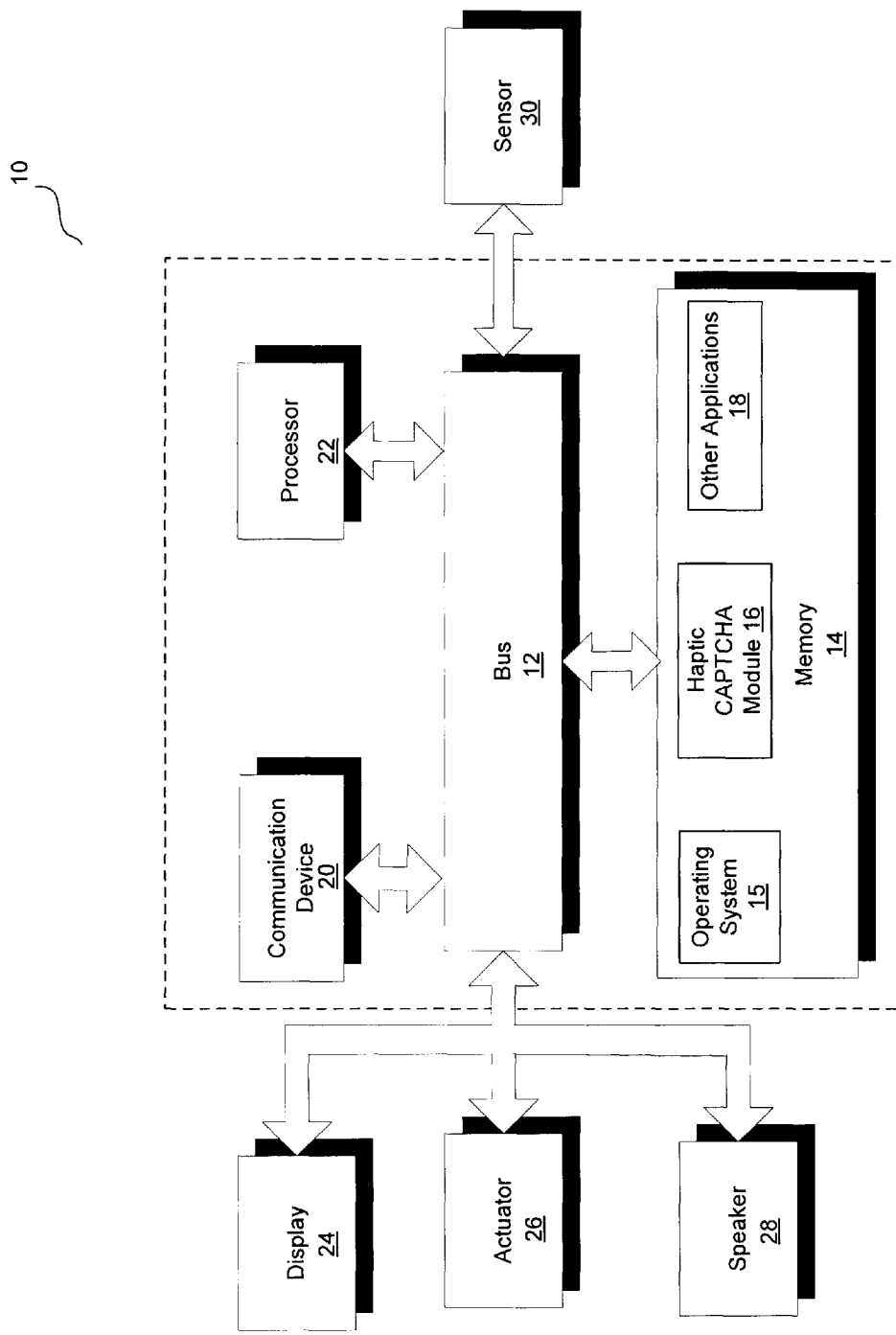
FIG. 1 is a block diagram of a computer server/system in accordance with an embodiment of the present invention.

FIG. 1 illustrates a block diagram of a system 10 in accordance with one embodiment of the invention. In one embodiment, system 10 is part of a mobile device, and system 10 provides haptics functionality for the mobile device. In another embodiment, system 10 is part of a device that is incorporated into an object in contact with a user in any way (e.g., furniture), and system 10 provides haptics functionality for such device. For example, in one embodiment, system 10 is part of a wearable device, and system 10 provides haptics functionality for the wearable device. Examples of wearable devices include wrist bands, headbands, eyeglasses, rings, leg bands, arrays integrated into clothing, or any other type of device that a user may wear on a body or can be held by a user. Some wearable devices can be "haptically enabled," meaning they include mechanisms to generate haptic effects. In another embodiment, system 10 is separate from the device (e.g., a mobile device or a wearable device), and remotely provides haptics functionality for the device.

Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer-readable instructions, data structures, program modules, or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disks, removable disks, compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a haptic CAPTCHA module 16 that provides haptics functionality, as disclosed in more detail herein. In certain embodiments, haptic CAPTCHA module 16 may comprise a plurality of modules, where each module provides specific individual functionality for providing haptic effects. System 10 typically includes one or more additional application modules 18 to include additional functionality, such as Integrator™ software by Immersion Corp.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or UI to a user. The display 24 may be a touch-sensitive input device, such as a touch screen, configured to send and receive signals from processor 22, and may be a multi-touch touch screen.

System 10, in one embodiment, further includes an actuator 26. Processor 22 may transmit a haptic signal associated with a haptic effect to actuator 26, which in turn outputs haptic effects such as vibrotactile haptic effects, electrostatic friction haptic effects, or deformation haptic effects. Actuator 26 includes an actuator drive circuit. Actuator 26 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, etc. In alternate embodiments, system 10 may include one or more additional actuators, in addition to actuator 26 (not illustrated in FIG. 1). Alternatively or additionally, actuator 26 may operate according to any other haptic technology such as thermal displays (e.g., hot/cold), electrotactile stimulation (i.e., stimulation of tactile receptors with electric current), kinesthetic feedback, etc. Yet another alternative or additional embodiment may implement electrical muscle stimulations such as a task that requires a user to determine what movement or movements the system is making them do and/or making them feel like doing.

Actuator 26 is an example of a haptic output device, where a haptic output device is a device configured to output any form of haptic effects, such as vibrotactile haptic effects, electrostatic friction haptic effects, deformation haptic effects, etc., in response to a drive signal. Accordingly, in alternate embodiments, actuator 26 may be replaced by some other type of haptic output device (not shown) that may be a non-mechanical or a non-vibratory device such as a device that uses electrostatic friction ("ESF") or ultrasonic surface friction ("USF"), a device that induces acoustic radiation pressure with an ultrasonic haptic transducer, a device that uses a haptic substrate and a flexible or deformable surface or shape changing device and that may be attached to a user's body, a device that provides projected haptic output such as a puff of air using an air jet, a laser-based projectile, a sound-based projectile, etc.

For example, one embodiment provides a laser-based projectile where laser energy ionizes air molecules in a concentrated region mid-air to provide plasma (a concentrated mixture of positive and negative particles). In one embodiment, the laser may be a femtosecond laser that emits pulses at very fast and very intense paces, and the faster the laser, the safer for humans to touch. The projectile may appear as a hologram that is haptic and interactive. When the plasma comes in contact with user skin, the user may sense the vibrations of energized air molecules in the concentrated region. Sensations on the user skin are caused by the waves that are generated when the user interacts with plasma in mid-air. Accordingly, haptic effects may be provided to the user by subjecting the user to such concentrated region. Alternatively or additionally, haptic effects may be provided to the user by subjecting the user to the vibrations generated by directed sound energy.

Further, in other alternate embodiments, system 10 may not include actuator 26 or any other haptic output device, and a separate device from system 10 includes an actuator or another haptic output device that generates the haptic effects, and system 10 sends generated haptic signals to that device through communication device 20.

System 10, in one embodiment, further includes a speaker 28. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, a digital loudspeaker, etc. In alternate embodiments, system 10 may include one or more additional speakers, in addition to speaker 28 (not illustrated in FIG. 1). Further, in other alternate embodiments, system 10 may not include speaker 28, and a separate device from system 10 includes a speaker that outputs the audio effects, and system 10 sends audio signals to that device through communication device 20.

System 10, in one embodiment, further includes a sensor 30. Sensor 30 may be configured to detect a form of energy, or other physical property, such as, but not limited to, sound, movement, acceleration, biological signals, distance, flow, force/pressure/strain/bend, humidity, linear position, orientation/inclination, radio frequency, rotary position, rotary velocity, manipulation of a switch, temperature, vibration, visible light intensity, etc. Sensor 30 may further be configured to convert the detected energy, or other physical property, into an electrical signal, or any signal that represents virtual sensor information. Sensor 30 may be any device, such as, but not limited to, an accelerometer, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS2 155, a miniature pressure transducer, a piezo sensor, a strain gauge, a hygrometer, a linear position touch sensor, a linear potentiometer (or slider), a linear variable differential transformer, a compass, an inclinometer, a magnetic tag (or a radio frequency identification tag), a rotary encoder, a rotary potentiometer, a gyroscope, an on-off switch, a temperature sensor (such as a thermometer, thermocouple, resistance temperature detector, thermistor, temperature-transducing integrated circuit, etc.), a microphone, a photometer, an altimeter, a biological monitor, a camera, a light-dependent resistor, etc., or any device that outputs an electrocardiogram, an electroencephalogram, an electromyograph, an electrooculogram, an electropalatograph, or any other electrophysiological output.

In alternate embodiments, system 10 may include one or more additional sensors, in addition to sensor 30 (not illustrated in FIG. 1). In some of these embodiments, sensor 30 and the one or more additional sensors may be part of a sensor array, or some other type of collection/arrangement of sensors. Further, in other alternate embodiments, system 10 may not include sensor 30, and a separate device from system 10 includes a sensor that detects a form of energy, or other physical property, and converts the detected energy, or other physical property, into an electrical signal, or other type of signal that represents virtual sensor information. The device may then send the converted signal to system 10 through communication device 20.

Generally, a CAPTCHA is an automated test to determine whether a user on a network (e.g., a user of an Internet website or any online service) is a human or an automated "bot" (i.e., a web/internet robot that is a software application running automated tasks over the web). For example, CAPTCHAs are commonly used to verify that a user that is creating an account or requesting pricing information on an online service is a real person and not an automated bot. CAPTCHAs implement a challenge-response authentication by requiring a user to perform a task. For example, some known systems use visual CAPTCHAs and require a user to perform a visual task such as typing the letters and numbers shown in a distorted image.

Some known systems use CAPTCHAs to ask users to identify two strings of letters including a known string used for a challenge-response test and an unknown string used for gathering information. For example, a reCAPTCHA system uses the second string of letters to improve the accuracy of scanned books by correcting mistakes in optical character recognition ("OCR").

One disadvantage of known systems that use visual CAPTCHAs is that computer vision algorithms are constantly improving, forcing visual CAPTCHA algorithms to become increasingly complex so they can provide a visual task that is easy for a human to perform but difficult for a computer. As a result, users may not be able to identify the distorted words of a CAPTCHA, and therefore may have to request multiple words before being able to solve one correctly.

Another disadvantage of known systems that use visual CAPTCHAs is that visual CAPTCHAs are not accessible to users with visual impairments. Some known systems use alternative CAPTCHAs for users with visual impairments. For example, some known systems provide audio-based solutions for such users and/or require them to call an operator.

In contrast to the known systems, embodiments of the present invention implement haptic CAPTCHAs. That is, some embodiments provide a haptic task as a test to determine whether a user of a website or online service is human. The haptic effects used for providing haptic CAPTCHAs may be produced through any device that is known to be accessible or available to the user or at the vicinity of the user, such as a smartphone, a tablet, a wearable device, a haptic mouse, or any other haptic device or medium described herein. Further, the haptic effects used for providing haptic CAPTCHAs may be according to any haptics operating principle, such as vibration, deformation, squeezing, tapping, friction, projected haptics, or any other haptics operating principle described herein.

Figure 2:
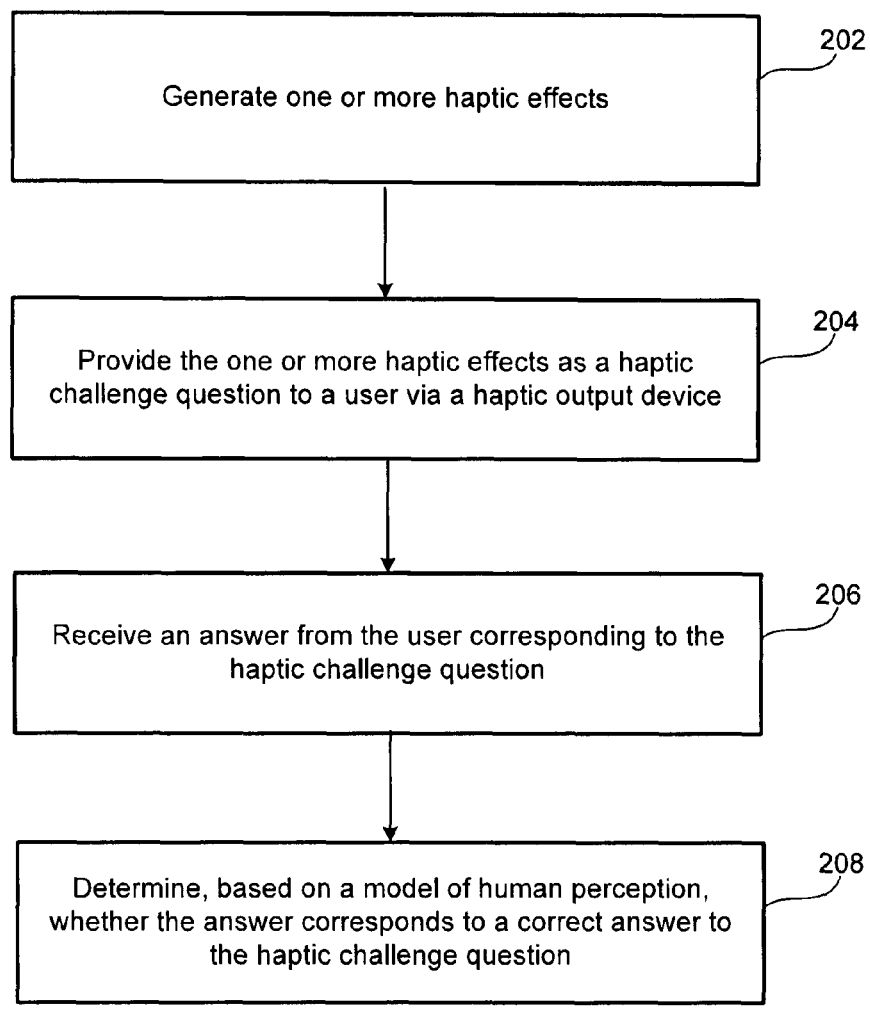
FIG. 2 is a flow diagram of the operation of a haptic Completely Automated Public Turing test to tell Computers and Humans Apart ("CAPTCHA") module of FIG. 1 when performing haptics functionality in accordance with embodiments of the present invention.

FIG. 2 is a flow diagram of haptic CAPTCHA module 16 of FIG. 1 when performing haptics functionality in accordance with embodiments of the present invention. In one embodiment, the functionality of the flow diagram of FIG. 2 (and FIGS. 3-5 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202 one or more haptic effects are generated and at 204 the one or more haptic effects are provided as a haptic challenge question to a user via a haptic output device.

At 206 an answer is received from the user corresponding to the haptic challenge question and at 208 it is determined, based on a model of human perception, whether the answer corresponds to a correct answer to the haptic challenge question. In one embodiment, the model of human perception is based on psychophysics, which is the scientific discipline that studies the connection between physical stimuli and subjective responses, as provided, for example, in "Measuring, estimating, and understanding the psychometric function: A commentary," Stanley A. Klein, Perception & Psychophysics, 2001, 63 (8), 1421-1455. Psychophysics allows for predicting the subjective response of a user in a perceptual task, as a function of a parameter of a physical stimuli. The subjective response may be, for example, whether one or two consecutive pulses of vibration are perceived by a human. The corresponding parameter of the physical stimuli may be, for example, the gap between the two pulses. Psychophysics generally studies thresholds of perception such as detection thresholds (e.g., the point at which a stimuli becomes perceptible) as well as discrimination thresholds (e.g., the point at which two stimuli can be differentiated). Psychophysical results are often expressed in terms of a psychometric function, with the abscissa being the stimulus strength, and the ordinate measuring an observer response. A psychometric function typically has a sigmoid shape.

In one embodiment, the answer is a haptic feedback. In one embodiment, the haptic feedback is a haptic task or a gesture-based interaction. Upon receiving the answer, one embodiment predicts a correct answer to the haptic challenge question, compares the correct answer with the answer received from the user, and determines that the user is a human when the answer matches the correct answer. In one embodiment, the predicting is performed based on one or more of the model of human perception, an actuator response, or an actuator location with respect to the user. In one embodiment, the generating, the providing, the receiving, the predicting, and the comparing are repeated when the answer does not match the correct answer.

In one embodiment, the generating is performed in response to an interaction of the user with a web site, and the user is allowed to proceed with subsequent interactions when the answer matches a correct answer corresponding to the haptic challenge question. In one embodiment, the interaction corresponds to an authentication of the user.

One embodiment further generates one or more secondary haptic effects, provides the one or more secondary haptic effects as a secondary haptic challenge question to the user via the haptic output device, and receives a secondary answer from the user corresponding to the secondary haptic challenge question. One embodiment uses the secondary response to tune at least one of the one or more haptic effects or at least one of the one or more secondary haptic effects. One embodiment uses the secondary response to configure or update a human perception model.

In one embodiment, the receiving of the answer from the user includes providing a plurality of answer options to the user and requesting the user to choose the answer from among the plurality of answer options, where the plurality of answer options includes a correct answer to the haptic challenge question. In one embodiment, the plurality of answer options includes at least one of a plurality of images, a plurality of video recordings, a plurality of audio recordings, or a plurality of haptic effects.

Some alternative or additional embodiments use a secondary haptic CAPTCHA to gather information about tactile perception. Generally, gathering information about tactile perception is performed by user testing, for example, through controlled experiments in a laboratory setting. Further, certain applications ("apps") may be occasionally released to be used by multiple users on their devices to gather haptic perception information. Haptic effects may also be tuned by sensing an affective state of a user (i.e., a representation of an emotive state, such as happy, sad, annoyed, angry, etc.) based on sensors that measure affective data (e.g., data indicative of an emotional state of the user such as a heart rate, a bio signal, a facial feature, etc.). In one embodiment, however, a secondary haptic CAPTCHA may be used to ask users to answer a secondary question that provides information that has been previously unknown/unavailable, and the gathered information may be used, for example, to identify how haptic effects are perceived on different platforms and thereby improve the tuning of haptic effects accordingly.

In one embodiment, the gathered information may be used to adjust a haptic effect according to various embodiments as described, for example, in U.S. application Ser. No. 13/792,754, the contents of which being incorporated herein. For example, the gathered information may be indicative of affective data (e.g., the secondary haptic task is provided to the user and the user is asked to indicate how it made them feel) and may therefore be used to tune the haptic effect of the secondary haptic task. For example, the affective state may be compared with a pre-defined affective state that represents an emotional state or a change in an emotional state that is desired to be caused by the haptic effect of the secondary haptic task, and one or more parameters of the haptic effect may be adjusted accordingly.

In some embodiments, haptic CAPTCHAs are provided by selecting haptic tasks for which a response of a human user is difficult to guess without knowledge of the corresponding tactile perception. For example, a haptic CAPTCHA may be provided by selecting a haptic task such that, given knowledge of the signals sent to the actuators to produce the haptic CAPTCHA, the response of a human user is difficult to guess without an understanding of human perception.

Some alternative or additional embodiments prevent an attacker from examining the signals sent to the actuators to produce the haptic CAPTCHA. For example, one embodiment encrypts the signal waveforms sent to the actuators such that only "TouchSense®" from Immersion Corp. can examine the signals and play the corresponding haptic effects. In one embodiment, the actuator signal is encoded before being sent to the receiving device/platform. For example, instead of sending a signal waveform, a corresponding code is transmitted to the receiving device/platform. The receiving device/platform then decodes the code to obtain the corresponding waveform signal and feeds the waveform signal to an actuator. The encoding may be according to a one to one mapping between a set of signal waveforms and a set of numbers. For example, a sequence of three pulses may be mapped to a number and the number may be digitally transferred to the receiving device/platform which can then map it back to the waveform signal based on a look up table or a function. In one embodiment, the waveform signal may first be digitized according to pulse code modulation ("PCM") and then encoded. In this embodiment, after decoding the encoded digitized signal, it is demodulated back to a signal waveform at the receiving device/platform and fed to the actuators.

One embodiment further predicts the response of a human user based on functionality that models statistical user information such as age, gender, occupation, etc. In one embodiment, such user information is gathered explicitly (e.g., through online forms). Alternatively or additionally, such user information is determined by using any sensors described herein in reference to sensor 30 of FIG. 1. For example, in one embodiment, age and/or gender of a user may be determined by applying computer vision and/or image/pattern recognition algorithms to images captured through a camera. In another embodiment, a Corneometer from Courage+Khazaka electronic GmbH may be used to determine properties of the skin of a user by performing skin hydration measurements. One embodiment also models available information on actuator properties and whether they are within range of a user. Yet another alternative or additional embodiment predicts the response of a human user based on functionality that models ambient and/or body temperature. For example, the cold may numb the fingers of a human user and reduce tactile sensitivity. In this embodiment, a temperature sensor may be used to gather temperature information, as described herein with reference to sensor 30 of FIG. 1.

In various embodiments, the user may be asked to count the number of haptic effects, determine the emotion communicated by a haptic effect, pick the more intense of two haptic effects, determine whether a haptic effect is synchronized with another effect (e.g., a sound, a visual effect, or another haptic effect), determine whether a haptic effect matches an image or sound, determine whether a haptic effect has been played at all, determine if two haptic effects are the same, determine if a haptic effect is synchronized with a user input (e.g., an action such as pressing a button), find an object on a plane (e.g., using ESF), determine whether the haptic track of a video track matches its content, perform an action when a haptic effect is felt, etc.

Some alternative or additional embodiments use a secondary haptic CAPTCHA to gather information about the perception of haptic effects. For example, one embodiment may ask the user to answer two questions or perform two tasks: a primary task whose answer is known, and a secondary task whose answer is unknown. For example, one embodiment may ask users to count the number of haptic effects played, and then ask whether the effects match a picture shown on the screen (e.g., an explosion). As such, the embodiment first confirms that the user is a human based on the count of haptic effects, and then gathers information about what type of effect best matches the picture shown on the screen (e.g., what haptic effect type best matches an explosion).

In some alternative or additional embodiments, the secondary question is configured for gathering information that is later used to generate reliable primary questions. For example, a secondary question may gather information about the effect of frequency on the ability of users to count haptic effects. This information may later be used to determine what answers to expect when asking users to count haptic effects of different frequencies, and then generate future haptic CAPTCHAs accordingly. In some embodiments, the entire CAPTCHA functionality is implemented on a user device. In some alternative embodiments, however, haptic effects may be provided on a user device but corresponding testing/validation and prediction functionality may be performed on a cloud service. For example, in one embodiment, the information gathered by the secondary question is communicated to a cloud service which establishes a perceptual model based on answers from a number of users.

In one embodiment, the same haptic effect may be used to implement both a primary haptic CAPTCHA and a secondary haptic CAPTCHA. Accordingly, this embodiment may rely on a single set of haptic effects to implement both primary and secondary haptic CAPTCHA functionality. For example, one embodiment provides a sequence of haptic effects to a user and then asks the user to indicate how many haptic effects they felt and also what emotion (e.g., out of a list of possible choices) best matches the haptic effects. Accordingly, this embodiment may already have, or may predict, the answer to the first question (thereby using the answer to the first question to determine whether the user is a human or not), while using the answer to the second question to gather information that was not previously known.

In one embodiment, the users who make mistakes in identifying a CAPTCHA may retry multiple different CAPTCHAs to arrive at a correct answer. In this embodiment, in order to improve user experience, haptic tasks are selected such that a high percentage of users (e.g., 95% of users) are able to provide a correct answer on the first try. Accordingly, although some users may still provide a wrong answer and have to retry, most users can provide a correct answer on the first try. In one embodiment, haptic tasks are configured such that the response of the user can be predicted with sufficient accuracy but does not need to be deterministic.

For example, in one embodiment, a haptic CAPTCHA may ask users to count the number of haptic effects being played. The actuator signals may be produced based on psychophysical data about the perception threshold of vibrations as a function of frequency and intensity, and also based on the required gap between two vibration pulses so that they are perceived as separate pulses. Generally, humans are not sensitive to vibrations at frequencies above a certain threshold, and two vibration pulses that are too close together will be merged perceptually and felt like a single pulse. The required information may be gathered from the scientific literature or based on psychophysical experiments. For example, user testing may be performed to determine the minimum gap between two pulses such that at least a considerable percentage of users (e.g., 95% of users) can perform the task correctly. The signals may also be obfuscated so that the correct answer is difficult to determine by a computer. For example, noise or spurious pulses with intensities below the perception threshold may be added. One embodiment may further use knowledge of the actuators and send signals to the actuators if the actuators will not be able to produce or will distort the vibrations (e.g., a vibration at a frequency that an actuator will attenuate). Accordingly, a human user will not feel the haptic effects and will therefore provide a response indicative of no haptic effects. However, a bot will not be able to determine the correct response (i.e., that there are no haptic effects that are perceptible by a human user) unless it also has sophisticated models of both human perception and actuator response.

In one embodiment that provides a haptic CAPTCHA that asks users to count the number of haptic effects being played, a model of human perception is used to evaluate the user responses. The model of human perception may provide functionality that predicts user responses based on one or more psychometric functions. For example, for the psychometric function corresponding to the subjective response of whether one or two consecutive pulses of vibration are perceived by a human, the x-axis may be the size of the temporal gap between the two pulses, and the y-axis may be the probability of feeling two distinct pulses. This psychometric function can therefore be used to predict the probability of a user providing different counts when asked to count the number of distinct effects in a sequence of pulses with gaps of varying size. For example, the psychometric function may be abstracted to a threshold such as the point at which the responses are split 50-50 (i.e., 50% of the responses are correct).

In some embodiments, the model of human perception may be an algorithm that predicts the number of pulses perceived based on two psychometric functions: a psychometric function indicative of the detection threshold based on the amplitude of a pulse, and a psychometric function indicative of the minimal gap required to feel two distinct pulses. In some embodiments, these two variables (i.e., amplitude and gap size) may not be independent. For example, the minimal gap size may depend on the amplitude. Accordingly, in one embodiment, for each value of the amplitude, a different psychometric function indicative of the gap size is implemented. One embodiment may also use multidimensional versions of a psychometric function.

One embodiment generates challenges that provide a desired distribution of expected responses. For example, the challenges may be selected to span a range of parameter values (e.g., amplitude and gap size) below and above the perception threshold in the corresponding psychometric functions. In one embodiment, if the answers are always picked at extremes (i.e., far away from the thresholds), an attacker may be able to guess the answer easily. For example, for a vibration motor that is rated to operate at a maximum voltage of 5V, it may be obvious that a vibration pulse will be perceptible when using an amplitude of 4.75V (or 95% of 5V), but imperceptible when using 0.25V (or 5% of 5V). However, without having a detailed model of human perception, it will be more difficult to guess the answer when the amplitude is between 2.25V and 2.75V (or between 45% and 55% of 5V). Accordingly, in one embodiment, parameter values (e.g., amplitude and gap size) are selected in the vicinity of the corresponding thresholds so that the answers are not easy to guess.

In one embodiment, a haptic CAPTCHA may ask the user to count the number of haptic effects, but the haptic signal is encrypted such that only TouchSense® from Immersion Corp. can decrypt it. Accordingly, an attacker cannot analyze the signal directly and can only estimate it based on accelerometer readings. In this embodiment, the actuator signals may be configured such that the accelerometer readings of an attacker are difficult to interpret (e.g., by adding noise).

One embodiment provides a haptic CAPTCHA based on determining whether a haptic effect is synchronized with another effect, such as a visual effect, another haptic effect, etc. In one embodiment, haptic CAPTCHA functionality is implemented by providing a haptic track in synchrony with a video track or by introducing a delay so that the haptic track is perceived as not synchronized with the video track. The delay may be introduced in either the haptic track or the video track. The embodiment then asks the user to indicate whether the haptic track is synchronized with the video track or not. Accordingly, the response of a human user can be predicted based on a priori knowledge of whether a delay is introduced or not. However, without having such information, an attacker (e.g., a bot) may not be able to guess the answer of the user.

One alternative or additional embodiment uses haptic CAPTCHAs to authenticate a user. The haptic CAPTCHA may be based on a model of tactile perception of a specific user. For example, assuming that for a specific haptic CAPTCHA, there is enough variation between responses of different users, the embodiment may predict the response of a specific user and use the information to identify that person. One such embodiment may implement a haptic CAPTCHA for a payment system. In this embodiment, when a user attempts to make a payment over the web, a haptic challenge question is provided to them to determine whether the user is authorized to make such payment. If the user provides a response associated with an authorized user for making the payment, the user is authenticated and allowed to make the payment.

In one embodiment, for example, a user may be filling out a questionnaire to create an account (e.g., a Gmail account) on their smart phone. As the user presses a "next" button, they feel three vibration pulses on their phone and a question pops up asking how many vibrations were felt. If the user responds "three," a confirmation is provided that the account has been created.

In one embodiment, for example, a user may be writing a comment about an article that they just read on a blog. As the user presses the "send" button, a bullseye appears on the screen with the text "Click when you feel a tactile effect." If the user clicks on the bullseye with their mouse when they feel two haptic effects, their comments are accepted and will appear on the website.

In one embodiment, for example, a user may be filling a form to register for email updates about a certain project. The user is presented with a question at the end of the form asking them to match a number of haptic effects to a number of images. For example, the user may be provided with three haptic effects and asked to match them to three images including an explosion, a machine gun, and a blank image (corresponding to a haptic effect that is barely perceptible to a human). If the user makes the correct assignment between the haptic effects and the images, the embodiment confirms that the user is a human and not a bot since the user did not feel the haptic effect corresponding to the blank image, and at the same time the embodiment identifies which of the other two haptic effects better matches an explosion or a machine gun.

One embodiment generates a haptic challenge, provides a UI that allows users to provide a response, and provides models that predict the response of a human user to the haptic challenge. The haptic challenge may be selected from multiple haptic challenges of same or different types/forms. For example, one embodiment asks the user to count the number of haptic effects being played. The embodiment may vary the challenge by changing the count of haptic effects, their intensity, the temporal spacing between them, the haptic noise added to the haptic effects, etc. These parameters may be varied within a range where the answer of the user can be predicted. The haptic effects may be played to the user using any available haptic devices, such as a vibration actuator, a squeezing wearable, etc.

The embodiment then queries a response to the haptic effects provided. For example, one embodiment allows the user to provide a response to the haptic challenge. For example, a smartphone may show onscreen a corresponding question (e.g., "How many haptic effects have you felt?") and then provide a UI that can receive the answer from the user (e.g., UI buttons for indicating the number of perceived haptic effects such as "1," "2," "more than 5," etc.).

The embodiment further assesses the user response. For example, one embodiment uses models to predict the response of the user. For example, one embodiment may use a model of human perception and actuator response to determine the most likely answer to a haptic challenge. For example, given the intensity and spacing of a number of certain haptic effects in a haptic challenge, one embodiment may determine that the haptic effects are likely to be felt as one long haptic effect. In another example, one embodiment may determine that the intensity of certain haptic effects and/or the noise added thereon are insufficient to affect the response of the actuator, and therefore such haptic effects do not result in perceptible effects on the count of haptic effects. Accordingly, if the user response does not match the expected answer, the embodiment determines that the user may be a bot and may optionally issue another haptic challenge.

One embodiment further provides a secondary haptic challenge to which it does not know the correct answer. The embodiment then proceeds with querying and assessing the user response as described herein with reference to various embodiments, but does not use the user answer to determine whether the user is a human or a bot. Instead, the answer is collected for later analysis. The collected data may be analyzed (e.g., by using Artificial Intelligence algorithms) to identify the expected answers to the secondary challenge. The collected data may also be used to improve user response prediction functionality. For example, one embodiment may know the effect of temporal spacing on the countability of a sequence of effects, but may ignore the effect of the intensity of the pulses. The embodiment may therefore use a secondary haptic challenge to identify the effect of intensity on user perception, and integrate this parameter in the primary haptic challenge once enough information has been gathered to accurately predict user responses.

One embodiment implements a haptic CAPTCHA based on counting the number of haptic effects played, where the user is presented with a number of pulses of vibration and is asked to indicate how many they felt. The embodiment generates a number of pulses with randomized properties. The properties may include, for example, frequency of each pulse, amplitude of each pulse, spacing between the pulses, etc. Generally, based on experimental data, a minimum amplitude $A_{man}$ is necessary for a pulse to be perceptible, and a minimum spacing $D_{min}$ is necessary for two consecutive pulses to be felt as separate pulses. These thresholds may depend on various factors such as properties of a pulse (e.g., frequency, duration, etc.) and/or properties of the user (e.g., gender, age, etc.).

Upon generating the pulses, the embodiment determines the count that is likely to be perceived by a human upon being provided with the pulses. For example, the embodiment may generate two pulses. If neither pulse has an amplitude greater than or equal to $A_{min}$, the perceived count is determined to be "0." If both pulses have an amplitude greater than or equal to $A_{min}$ and the spacing between the pulses is greater than or equal to $D_{min}$, the perceived count is determined to be "2." If both pulses have an amplitude greater than or equal to $A_{min}$ and the spacing between the pulses is less than $D_{min}$, the perceived count is determined to be "1." The embodiment may be applied recursively to determine the perceived count for any arbitrary number of pulses.

The embodiment may generate the two pulses to have pseudo random properties, where each pseudo random property is generated based on a pseudo random number generator function (e.g., an algorithm that generates a sequence of numbers with properties that are similar to a sequence of random numbers) and a corresponding range. The ranges used for generating the pseudo random properties may include values for that property that would result in pulses that are perceptible for humans. Alternatively, the ranges used for generating the pseudo random properties may further include values for that property that would result in pulses that are not perceptible for humans. Accordingly, the generated pulses may or may not be perceptible for humans, and the embodiment performs perceived effect counting for the generated pulses based on knowledge of the perceptibility of the properties.

Figure 3:
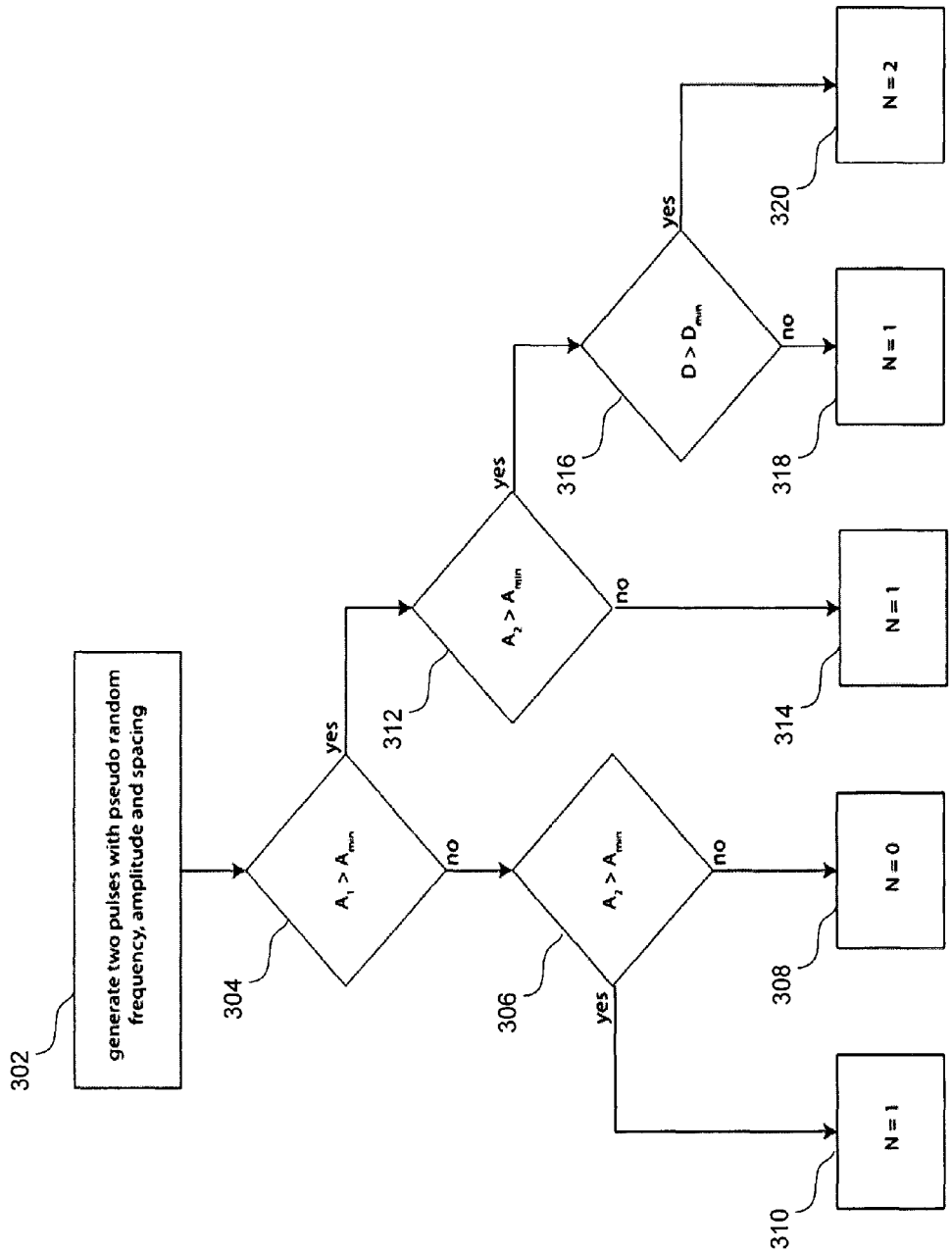
FIGS. 3-5 are flow diagrams of haptics functionality performed by haptic systems according to embodiments of the present invention.

FIG. 3 is a flow diagram of an example decision tree for effect counting according to the aforementioned embodiment. Although the embodiment of FIG. 3 implements a haptic CAPTCHA based on two pulses, any other number of pulses may be similarly implemented in alternative or additional embodiments.

At 302 two pulses with pseudo random properties are generated. The properties may include frequency, amplitude, spacing, etc. Each property may be generated based on a pseudo random number generator function and a corresponding range. At 304 it is determined whether the amplitude of the first pulse is greater than or equal to $A_{min}$, and if not, at 306 it is determined whether the amplitude of the second pulse is greater than or equal to $A_{min}$, and if not, then neither pulse has an amplitude greater than or equal to $A_{min}$, therefore at 308 the perceived count is determined to be "0." However, if at 306 it is determined that the amplitude of the second pulse is greater than or equal to $A_{min}$, then only one pulse has an amplitude greater than or equal to $A_{min}$, therefore at 310 the perceived count is determined to be "1."

If at 304 it is determined that the amplitude of the first pulse is greater than or equal to $A_{min}$, at 312 it is determined whether the amplitude of the second pulse is greater than or equal to $A_{min}$, and if not, then only one pulse has an amplitude greater than or equal to $A_{min}$, therefore at 314 the perceived count is determined to be "1."

If at 312 it is determined that the amplitude of the second pulse is also greater than or equal to $A_{min}$, at 316 it is determined whether the spacing between the pulses is greater than or equal to $D_{min}$, and if not, then both pulses have an amplitude greater than or equal to $A_{min}$ but the spacing between the pulses is less than $D_{min}$, therefore at 318 the perceived count is determined to be "1." However, if at 316 it is determined that the spacing between the pulses is greater than or equal to $D_{min}$, then at 320 the perceived count is determined to be "2."

Upon determining the perceived count for a sequence of generated pulses, such sequence of pulses may be provided as haptic CAPTCHA. If a user identifies the same count as the perceived count, they are deemed to be human and not a bot, and if not, a different haptic and/or other type of CAPTCHA may be provided to the user to retry.

One embodiment implements a haptic CAPTCHA based on a database that relates a number of haptic challenge tasks (e.g., haptic effects) with a number of previously identified corresponding responses. The responses may include, for example, selection of an image/sound/video recording among multiple images/sounds/video recordings. The embodiment may use the past response information in the database to determine most and least likely responses to a haptic challenge question, and then provide at least the most likely response as an option to a user that is subjected to the haptic challenge. For example, one embodiment may provide a haptic track to a user and ask them whether the haptic track corresponds to a video ad and matches its content. One alternative embodiment may implement haptic CAPTCHA based on haptic effect counting by using a database of past user answers.

Figure 4:
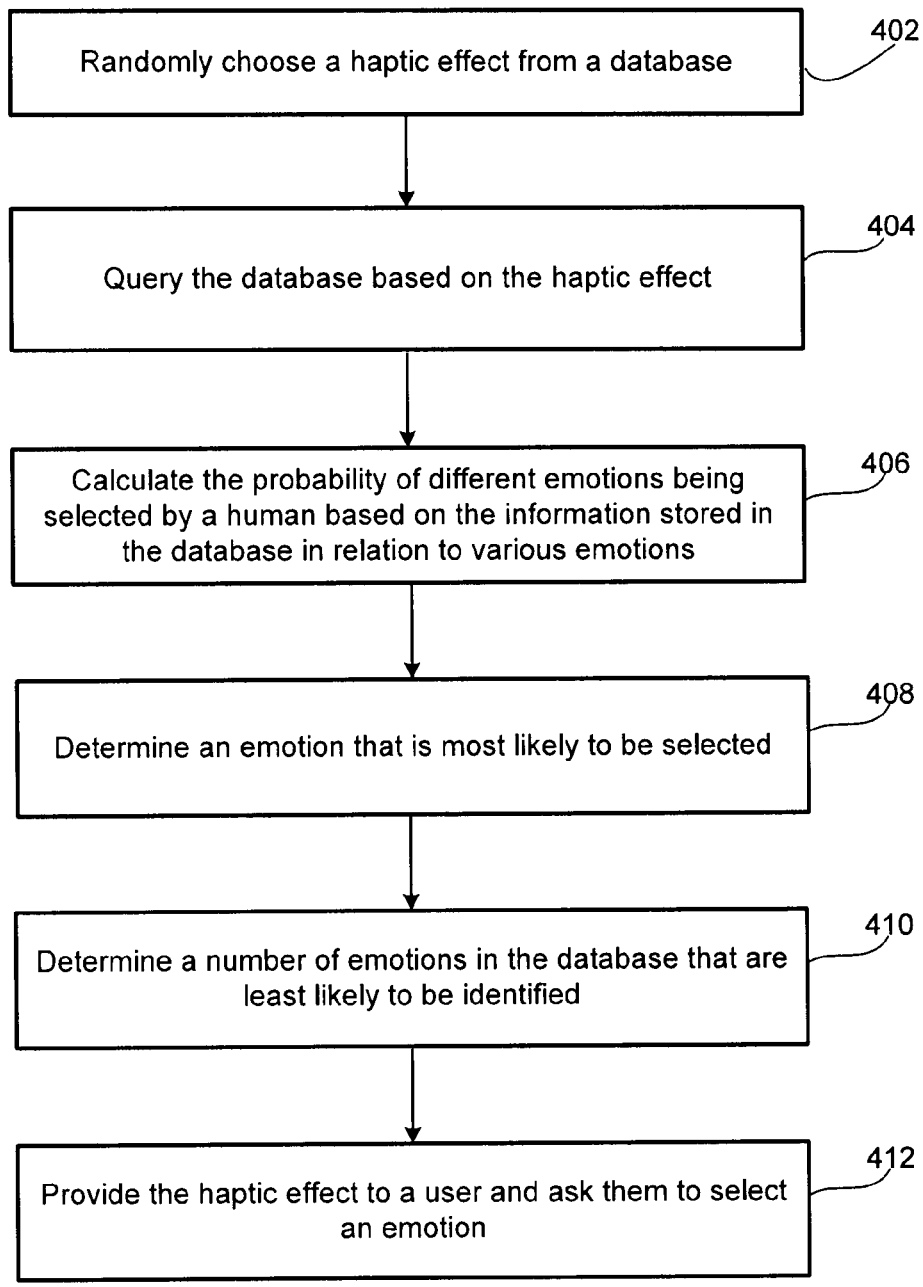

FIG. 4 is a flow diagram of an embodiment that implements haptic CAPTCHA based on a database that relates emotions with haptic effects, where a user is presented with a haptic effect and is then asked to select the matching emotion from a list of emotions. At 402, a haptic effect is randomly chosen from the database. In one embodiment, the database may further include information about the number of times that different emotions were picked by experiment participants when presented with the haptic effects. In one embodiment, the database may also include information about the experiment participants and the devices used for conducting the experiment.

At 404 the database is queried based on the haptic effect chosen at 402. The query may be further based on other relevant information such as the age of a participant and the device being used. Then, at 406 the probability of different emotions being selected by a human is calculated based on the information stored in the database in relation to various emotions. At 408 the emotion that is most likely to be selected is determined. At 410 a number of emotions that are least likely to be selected are determined (e.g., four emotions that have a probability less than 5% of being selected by users).

At 412 a user is provided with the haptic effect and asked to select an emotion from a list that includes the most likely emotion and the least likely emotions or any other emotions. If the user identifies the most likely emotion, they are deemed to be human and not a bot, and if not, a different haptic and/or other type of CAPTCHA may be provided to the user to retry. For example, blocks 402 through 412 may be repeated to provide the user with a different haptic CAPTCHA that is again based on communicating an emotion.

Figure 5:
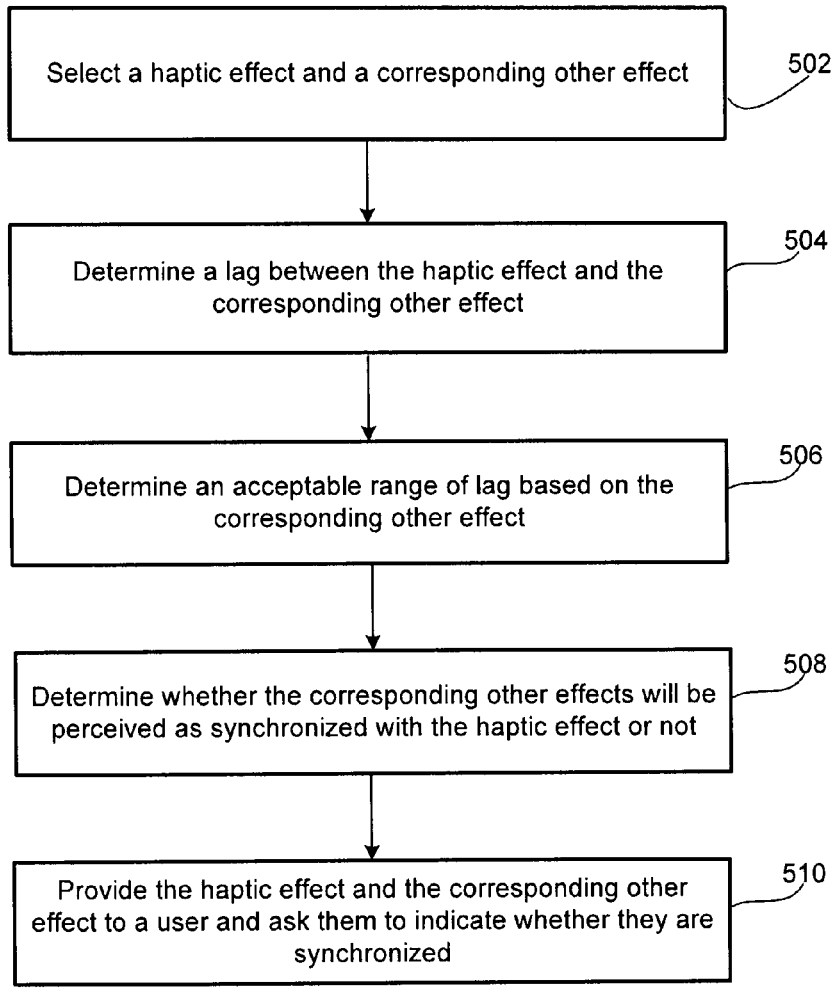

FIG. 5 is a flow diagram of an embodiment that implements haptic CAPTCHA by determining whether a haptic effect is synchronized with another effect, such as a sound, a visual effect, another haptic effect, etc. At 502 a haptic effect and a corresponding other effect (e.g., audio/video signals) are selected. At 504 a lag between the haptic effect and the corresponding other effect is determined. The lag may be selected within pre-defined limits. At 506 a database is queried or a mathematical model is used to determine the acceptable range of lag based on the corresponding other effect (e.g., the audio/video effects being used). At 508 it is determined whether the corresponding other effects will be perceived as synchronized with the haptic effect or not. At 510 the haptic effect and the corresponding other effect are provided to a user and the user is asked to indicate whether they are synchronized. If the user provides the correct answer, they are deemed to be human and not a bot, and if not, a different haptic and/or other type of CAPTCHA may be provided to the user to retry. For example, blocks 502 through 510 may be repeated to provide the user with a different haptic CAPTCHA that is again based on synchronization of a haptic effect with another effect.

One embodiment implements a haptic CAPTCHA that requires a user to provide a corresponding haptic response/feedback. In one embodiment, the haptic feedback may include kinesthetic feedback such as active and resistive force feedback. The haptic feedback may be sensed by any device and/or sensor described herein. For example, one embodiment may provide the user with a haptic challenge question and then require the user to perform a haptic task in response, e.g., tap a haptic input device for a certain number of times, provide a gesture-based interaction input for a certain number of times, etc. The tapping may be sensed by any touchscreen such as a pressure sensitive touchscreen, a capacitive touchscreen, a resistive touchscreen, etc., or a touchscreen operating according to any other principle such as surface acoustic waves, surface capacitance, projected capacitance, mutual capacitance, self-capacitance, infrared grids, infrared acrylic projection, optical imaging, dispersive signals, acoustic pulse recognition, etc.

In one embodiment, the haptic challenge question may be to determine how many vibrations are being perceived, and the corresponding haptic response may be to tap a haptic input device for the same or a corresponding number of times (e.g., tap twice if the user feels one vibration and tap once if the user feels two vibrations) or perform a gesture-based interaction for the same or a corresponding number of times. One alternative embodiment may provide a haptic challenge question and then request the user to perform a certain type of gesture-based interaction (e.g., press if the user feels one pulse, pinch if the user feels two pulses, shake if the user feels three pulses, perform a finger trace of a specific pattern if the user feels four pulses, etc.). In some embodiment, the haptic feedback options may include providing no haptic feedback or providing a certain haptic feedback with a certain delay, duration, strength, frequency, etc. The timing parameters of the haptic feedback may be measured based on a system timer. The strength of the haptic feedback may be measured based on an accelerometer, a pressure sensor, etc.

One embodiment implements a haptic CAPTCHA for a wearable haptic device. For example, one embodiment provides a haptic challenge question via a wearable haptic device to be responded by a human wearing the wearable device. One embodiment may first determine whether the wearable haptic device is being worn by a human before providing the haptic challenge question. For example, one embodiment may first collect/sense biological signals of a wearer of a wearable device (e.g., temperature, pulse, blood pressure, etc.) and thus determine that the wearable device is indeed being worn or used by a human before providing the haptic challenge question. The biological signals may be collected/sensed via the wearable device itself or via a separate device/sensor that is attached to or embedded within the wearable device or is in the proximity of the wearable device.

In one embodiment, after providing a primary haptic CAPTCHA, one or more additional haptic CAPTCHAs may also be provided to improve the accuracy of haptic CAPTCHA functionality. For example, after providing a primary haptic challenge to a user and receiving a response, one embodiment provides a secondary haptic challenge to the user and then uses the responses to both the primary haptic challenge and the secondary haptic challenge to better estimate the likelihood of the user being a human and not a bot. One embodiment provides a sequence of haptic challenges to a user and receives respective responses to each challenge. This embodiment continues the sequence until it is determined that the likelihood of the user being a human is above a certain threshold (i.e., indicating that the user is likely to be a human) or until the number of failed haptic challenges passes a certain threshold (i.e., indicating that the user is not likely to be a human).

As disclosed, embodiments allow for providing CAPTCHAs that rely on the sense of touch. In some embodiments, a haptic CAPTCHA may also be configured to collect additional information about how certain haptic effects are perceived (tactile perception) or to authenticate a user. Accordingly, embodiments give the end user the possibility of relying on the sense of touch for providing various challenge-response functionalities.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer readable medium having instructions stored thereon that, when executed by a processor, cause the processor to perform haptic challenge-response functionality comprising:
   generating one or more haptic effects;
   providing the one or more haptic effects as a haptic challenge question via a haptic output device;
   receiving an answer from a user corresponding to the haptic challenge question; and
   determining, based on a model of human perception including a perception threshold comprising at least one of a detection threshold and a discrimination threshold, whether the answer corresponds to a correct answer to the haptic challenge question.

2. The computer readable medium of claim 1, wherein the instructions for determining further comprise instructions for:
   predicting the correct answer to the haptic challenge question;
   comparing the correct answer with the answer received from the user; and
   determining that the user is a human when the answer matches the correct answer.

3. The computer readable medium of claim 2, wherein the instructions for predicting further comprise instructions for predicting the correct answer based on one or more of the model of human perception, an actuator response, and an actuator location with respect to the user.

4. The computer readable medium of claim 2, further comprising instructions for:
   repeating the generating, the providing, the receiving, the predicting, and the comparing, when the answer does not match the correct answer.

5. The computer readable medium of claim 1, wherein instructions for generating further comprise instructions for generating one or more haptic effects in response to an interaction of the user with a web site, wherein the user is allowed to proceed with subsequent interactions when the answer matches the correct answer corresponding to the haptic challenge question.

6. The computer readable medium of claim 5, wherein the interaction corresponds to an authentication of the user.

7. The computer-readable medium of claim 1, further comprising instructions for:
   generating one or more secondary haptic effects;
   providing the one or more secondary haptic effects as a secondary haptic challenge question to the user via the haptic output device; and
   receiving a secondary answer from the user corresponding to the secondary haptic challenge question.

8. The computer-readable medium of claim 7, further comprising instructions for:
   using the secondary answer to tune at least one of the one or more haptic effects or at least one of the one or more secondary haptic effects.

9. The computer-readable medium of claim 7, further comprising instructions for:
using the secondary answer to configure or update the model of human perception.

10. The computer-readable medium of claim 1, wherein the answer is a haptic feedback.

11. The computer-readable medium of claim 10, wherein the haptic feedback is a haptic task or a gesture-based interaction.

12. The computer-readable medium of claim 1, wherein the instructions for receiving further comprise:
providing a plurality of answer options to the user; and
requesting the user to choose the answer from among the plurality of answer options, wherein the plurality of answer options includes a correct answer to the haptic challenge question.

13. The computer-readable medium of claim 12, wherein the plurality of answer options includes at least one of a plurality of images, a plurality of video recordings, a plurality of audio recordings, and a plurality of haptic effects.

14. A method of performing haptic challenge-response functionality comprising:
generating one or more haptic effects;
providing the one or more haptic effects as a haptic challenge question to a user via a haptic output device;
receiving an answer from the user corresponding to the haptic challenge question; and
determining, based on a model of human perception including a perception threshold comprising at least one of a detection threshold and a discrimination threshold, whether the answer corresponds to a correct answer to the haptic challenge question.

15. The method of claim 14, wherein determining whether the answer corresponds to the correct answer includes:
predicting the correct answer to the haptic challenge question;
comparing the correct answer with the answer received from the user; and
determining that the user is a human when the answer matches the correct answer.

16. The method of claim 15, wherein predicting is based on one or more of the model of human perception, an actuator response, and an actuator location with respect to the user.

17. The method of claim 15, further comprising:
determining that the answer received from the user does not match the correct answer, and
repeating generating the one or more haptic effects, providing the one or more haptic effects, receiving the answer from the user, predicting the correct answer, and
comparing the correct answer with the answer received from the user, when the answer received from the user does not match the correct answer.

18. The method of claim 14, further comprising:
generating one or more secondary haptic effects;
providing the one or more secondary haptic effects as a secondary haptic challenge question to the user via the haptic output device; and
receiving a secondary answer from the user corresponding to the secondary haptic challenge question.

19. The method of claim 18, further comprising:
using the secondary answer to tune at least one of the one or more haptic effects or at least one of the one or more secondary haptic effects.

20. A system for performing haptic challenge-response functionality, comprising:
a computer memory configured to store program instructions; and
a processor configured to execute the program instructions to:
generate one or more haptic effects;
provide the one or more haptic effects as a haptic challenge question to a user via a haptic output device;
receive an answer from the user corresponding to the haptic challenge question; and
determine, based on a model of human perception including a perception threshold comprising at least one of a detection threshold and a discrimination threshold, whether the answer corresponds to a correct answer to the haptic challenge question.

* * * * *